Patented July 4, 1950

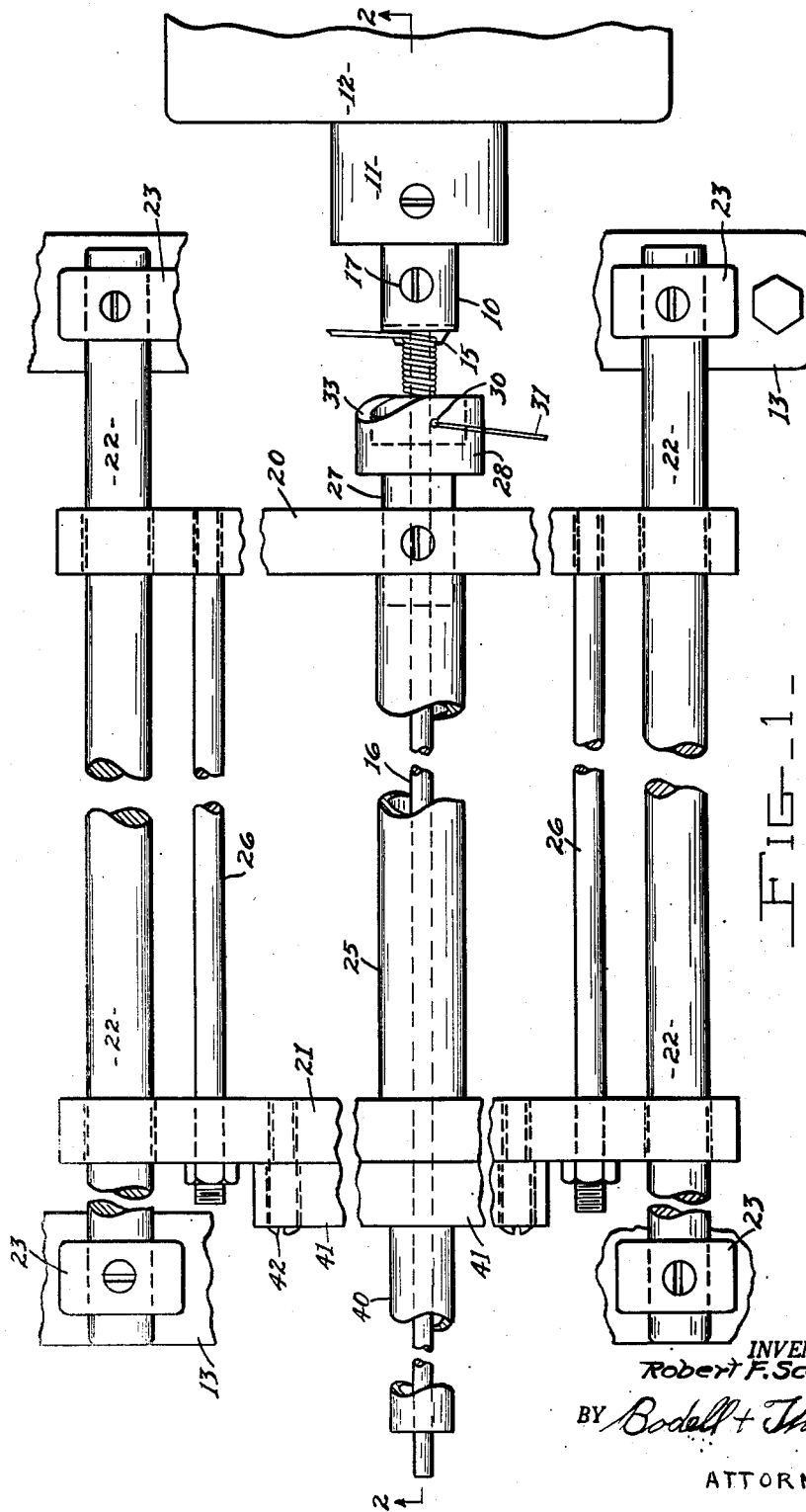

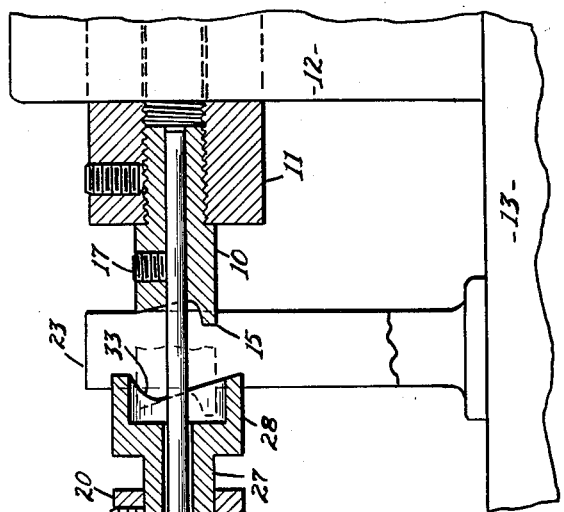

2,514,096

UNITED STATES PATENT OFFICE 2,514,096

SPRING WINDING DEVICE

Robert F. Scott, Syracuse, N. Y.

Application October 31, 1946, Serial No. 706,864

2 Claims. (Cl. 153—67)

This invention relates to a device for winding springs. More particularly, the device is intended for winding what is known as close wound helical tension springs where the turns of wire normally touch each other previous to any stress being applied to the spring.

The invention has as an object, a particularly simple and economical device embodying a structure by which springs of the type referred to of appreciably great length can be quickly and conveniently wound.

The invention consists in the novel features and in the combinations and constructions hereinafter set forth and claimed.

In describing this invention, reference is had to the accompanying drawings in which like characters designate corresponding parts in all the views.

Figure 1 is a top plan view, partly broken away, of a device embodying my invention.

Figure 2 is a lengthwise sectional view taken on line 2—2, Figure 1.

Figure 3 is a side elevational view of the wire feed socket.

Figure 4 is an end elevational view of the socket.

The device comprises a driving member 10 journalled for rotation in a suitable frame. As here shown, the driving member 10 is mounted in the end of a spindle 11 journalled in a head stock 12 mounted upon a base 13. The driving member is formed with a projection 15 extending parallel to an arbor 16 which is mounted in the driving member 10 and rotatable therewith. The arbor 16 is in the nature of a rod, one end of which is positioned in the driving member 10 and engaged by a set screw 17 to secure it in place. It will be understood that the diameter of the arbor 16 varies according to the size of the spring to be wound.

A guide member is mounted in the frame and the arrangement is such that as the coils of wire accumulate on the arbor 16 in the spring winding operation, relative axial movement between the guide and the driving member is effected. As here shown, the guide member comprises a pair of cross members 20, 21, apertured at their ends to receive supporting rods 22 mounted at their ends in uprights 23 extending upwardly from the base 13 and on which they are freely slidable. A spacer tube 25 is interposed between the cross members 20, 21, and in alinement with the arbor 16, the cross members being secured together by tie rods 26. The forward cross member 20 is apertured to receive the shank 27 of a socket 28, the shank extending slightly into the contiguous end of the tube 25 to maintain the same concentrically with the arbor which passes through an aperture in the shank 27. The bore of the socket 28 is of sufficient diameter to encircle the confronting end of the driving member 10 and is formed in one side wall with an aperture 30 arranged to feed the wire stock 31 transversely of the socket and in juxtaposition to one side of the arbor 16. Preferably, the side wall of the socket 28, opposite the aperture 30, is recessed as at 33 to permit the wire 31 to be initially extended beyond the socket wall, as at 34, Figure 4.

In operation the guide member, with the wire positioned as shown at 34, is moved into engagement with the rotating driving member 10. The projection 15 engages the wire and winds it about the mandrel 16. As the turns of wire accumulate, the carriage, or guide member, is moved axially along the arm, as shown in Figure 1, and this operation continues until the free end of the arbor is no longer positioned in the tube 40, at which time the wire automatically breaks off. The operator then slides the wound spring off from the arbor and again slides the guide forwardly until the socket 28 receives the end of the drivng member, whereupon the operation is repeated. With this arrangement, close wound springs can be produced very rapidly. On ordinary size springs, the driving member and arbor can be rotated in the neighborhood of 4000 revolutions per minute.

If the arbor is of appreciable length, the guide member is provided with a rearwardly extending tube 40, one end of which is attached to a block 41 secured to the rear cross member 21, as by screws 42. The function of the tube 40 is to prevent the free end of the arbor from whipping when it is rotated at high speeds.

What I claim is:

1. A spring winding device comprising a suitable frame, a driving member journalled in the frame, an arbor extending outwardly from the driving member and being rotatable therewith, the free end of said driving member being formed with a projection extending axially of the arbor and in spaced relation thereto, a guide member slidably mounted in the frame and being formed with an aperture to receive said arbor, and a socket confronting the free end of said driving member and arranged to encircle the same, said socket being formed with a wire feed aperture in one wall thereof arranged to guide a wire transversely of the socket in juxtaposition to the arbor, said driving member being operable upon rotation and when positioned in said socket to have said projection automatically engage the wire and wind the same about the arbor, said guide member being propelled axially along said arbor away from the driving member by the accumulation of turns of wire on the arbor, and means cooperable to restrain said guide member from rotation.

2. An automatic spring winding device comprising a suitable frame, a driving member journalled in the frame, a guide member mounted for sliding movement on the frame toward and from the driving member parallel to the axis thereof, a winding arbor rotatable with said driving member and extending outwardly therefrom through said guide member, said driving member having a projection extending axially of the arbor toward the guide member and in spaced relation to the arbor, said guide member being formed with a wire feed aperture arranged to guide a wire transversely of the arbor in juxtaposition thereto, said driving member being operable upon rotation and when positioned in proximity to the confronting face of said guide member to have said projection automatically engage the wire and wind the same about the arbor, said guide member being propelled axially along said arbor away from the driving member by the accumulation of turns of wire on the arbor, and means cooperable to restrain said guide member from rotation.

ROBERT F. SCOTT.

REFERENCES CITED

The following references are of record in the file of this patent:

UNITED STATES PATENTS

| Number | Name | Date |
|---|---|---|
| 561,579 | Gare | June 9, 1896 |
| 812,779 | Ackley | Feb. 13, 1906 |
| 1,113,779 | Greenleaf | Oct. 13, 1914 |
| 1,207,911 | Hathaway | Dec. 12, 1916 |
| 1,526,716 | Neunherz | Feb. 17, 1925 |
| 1,562,645 | Jones | Nov. 24, 1925 |
| 2,384,485 | Norton | Sept. 11, 1945 |

FOREIGN PATENTS

| Number | Country | Date |
|---|---|---|
| 268,685 | Great Britain | Apr. 7, 1927 |